United States Patent
Strauss et al.

(10) Patent No.: US 6,272,126 B1
(45) Date of Patent: *Aug. 7, 2001

(54) INTERNETWORK TELEPHONY WITH ENHANCED FEATURES

(75) Inventors: Michael J. Strauss, Potomac, MD (US); Robert D. Farris, Sterling, VA (US)

(73) Assignee: Bell Atlantic Network Services, Inc., Arlington, VA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/899,813

(22) Filed: Jul. 24, 1997

(51) Int. Cl.[7] .............................. H04L 12/66; H04M 7/00
(52) U.S. Cl. ...................... 370/352; 370/401; 379/88.17; 379/212; 379/220; 379/900
(58) Field of Search ...................................... 370/352, 354, 370/355, 356, 401, 402, 403, 404; 379/210, 211, 212, 213, 215, 220, 207, 93.01, 88.17, 900

(56) References Cited

U.S. PATENT DOCUMENTS

| | | |
|---|---|---|
| 4,659,877 | 4/1987 | Dorsey et al. . |
| 4,872,160 | 10/1989 | Hemmady et al. . |
| 4,872,197 | 10/1989 | Pemmaraju . |
| 4,958,341 | 9/1990 | Hemmady et al. . |
| 5,029,196 | 7/1991 | Morganstein . |
| 5,109,405 | 4/1992 | Morganstein . |
| 5,341,374 | 8/1994 | Lewen et al. . |
| 5,375,068 | 12/1994 | Palmer et al. . |
| 5,410,754 | 4/1995 | Klotzbach et al. . |
| 5,434,913 | 7/1995 | Tung et al. . |
| 5,490,247 | 2/1996 | Tung et al. . |
| 5,493,568 | 2/1996 | Sampat et al. . |
| 5,608,786 | 3/1997 | Gordon . |
| 5,724,355 | 3/1998 | Bruno et al. . |
| 5,726,984 | 3/1998 | Kubler et al. . |
| 5,751,706 | * 5/1998 | Land ..................... 370/352 |
| 5,802,160 | * 9/1998 | Kugell et al. .............. 379/211 |
| 5,815,562 | * 9/1998 | Iglehart et al. ............ 379/211 |
| 5,946,299 | * 8/1999 | Blonder ................. 370/352 |
| 5,999,525 | * 12/1999 | Krishnaswamy ............ 370/352 |
| 6,067,350 | * 5/2000 | Gordon ................... 370/352 |

OTHER PUBLICATIONS

Yang, INETphone: Telephone Services and Servers on Internet, RFC 1789, Apr. 4, 1995.*

(List continued on next page.)

Primary Examiner—Wellington Chin
Assistant Examiner—Steven Nguyen
(74) Attorney, Agent, or Firm—McDermott, Will & Emery (57) ABSTRACT

Interconnect traffic between local exchange carrier (LECs) networks and other carrier networks, particularly competitive local exchange carrier (CLEC) networks, dictates a need for efficient monitoring and analysis of the interconnect traffic. In accord with the invention, monitor equipment on the LEC network captures call related messages produced by the LEC network and compiles data from those messages to form call detail records for the interconnect traffic. These records are loaded into a relational database. A data preparation routine enhances the data, for example, by translating certain codes from the records into more useful text and by spreading or binning usage over predefined time intervals. An on-line analytical processing program runs one or more applications to allow the LEC to analyze the interconnect traffic between the LEC network and the other carrier's network. The analysis provides useful traffic data for accounting purposes, e.g. for use in determining jurisdictional factors for reciprocal compensation calculations. The data also enables the LEC to engineer upgrades of the network to provide cost effective service for the traffic to and from the other carrier's network.

3 Claims, 5 Drawing Sheets

OTHER PUBLICATIONS

"Innovations in Internet Telephony: The Internet as the Competitor to the POTS Network", Innovation in the Internet Telephony: The Internet as the Successor to the POTS Network, Sears, Andrew, Feb. 28, 1996, pp. 1–6.

"Internet Talk Radio Geek of the Week Mobile IP Networking", Carl Malamud Interviews with Phil Karn & Jun Murai, Nov. 1993 and Jul. 1993.

"Audio and Video over the Internet", CT and the 'Net, Mar. 1996, pp. 198–221.

"Supercharging the Web with Computer Telephony", CT and the 'Net, Mar. 1996.

* cited by examiner

| 301-223-4567 | JOHN DOE |
|---|---|
| DIALED NUMBER | DESTINATION NUMBER |
| 518-1234 | 504-678-1482 |
| 518-1235 | 504-712-6812 |
| 518-1236 | 504-401-1000 |
|  |  |

INTERNETWORK TELEPHONY WITH ENHANCED FEATURES

TECHNICAL FIELD

The present invention relates to a system and method of utilization of communication gateways for private or public interexchange telephone communication, with at least the interexchange portion of the telephone communication transported over a public packet data network such as the Internet, wherein the system provides enhanced telecommunication features.

BACKGROUND

Attention recently has been directed to implementing a variety of communication services, including voice telephone service, over the worldwide packet data network now commonly known as the Internet.

In a simplified fashion the Internet may be viewed as a series of packet data switches or 'routers' connected together with computers connected to the routers. The Information Providers (IPs) constitute the end systems which collect and market the information through their own servers. Access providers are companies such as UUNET, PSI, MCI and SPRINT which transport the information. Such companies market the usage of their networks.

Figure 3:
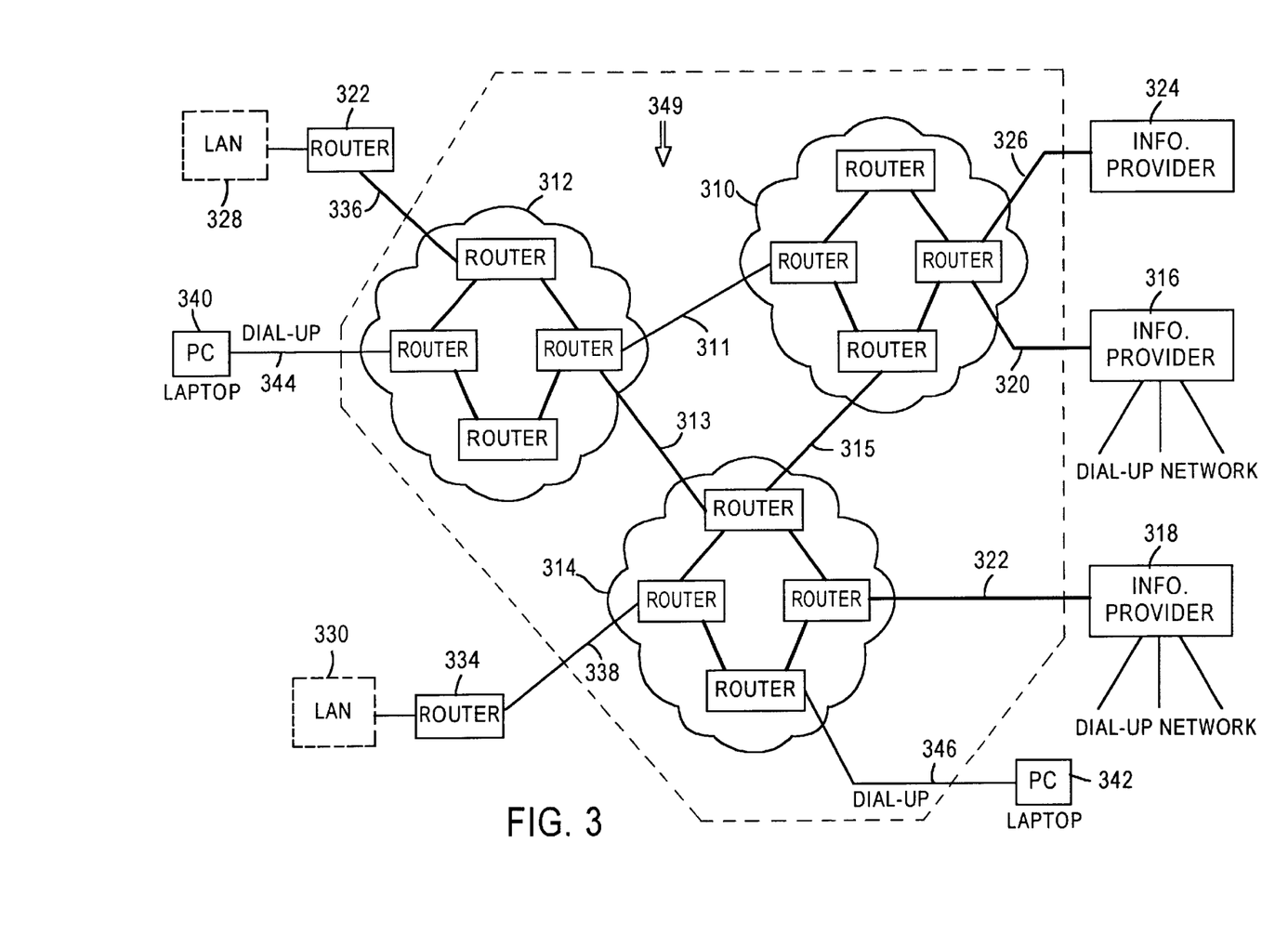
FIG. 3 is a block diagram of the public packet switched data network now commonly referred to as the Internet.

FIG. 3 shows a simplified diagram of the Internet and various types of systems typically connected thereto. Generally speaking the Internet consists of Autonomous Systems (AS) type packet data networks which may be owned and operated by Internet Service Providers (ISPs) such as PSI, UUNET, MCI, SPRINT, etc. Three such AS/ISPs appear in FIG. 3 at 310, 312 and 314. The Autonomous Systems (ASs) are linked by Inter-AS Connections 311, 313 and 315. Information Providers (IPs) 316 and 318, such as America Online (AOL) and CompuServe, connect to the Internet via high speed lines 320 and 322, such as T1/T3 and the like. Information Providers generally do not have their own Internet based Autonomous Systems but have or use Dial-Up Networks such as SprintNet (X.25), DATAPAC and TYMNET.

By way of current illustration, MCI is both an ISP and an IP, SPRINT is an ISP, and the Microsoft Network (MSN) is an IP using UUNET as an ISP. Other information providers, such as universities, are indicated in exemplary fashion at 324 and are connected to the AS/ISPs via the same type connections here illustrated as T1 lines 326. Corporate Local Area Networks (LANs), such as those illustrated in 328 and 330, are connected through routers 332 and 334 and high speed data links such as T1 lines 336 and 338. Laptop computers 340 and 342 are representative of computers connected to the Internet via the public switched telephone network (PSTN) and are shown connected to the AS/ISPs via dial up links 344 and 346.

Recently, software has been developed that allows personal computer (PC) users to conduct two-way voice conversations over the Internet. An audio card in the PC digitizes speech inputs received via a microphone and converts digital speech signals received from the Internet into analog audio output signals. The software provides compression and decompression of the digital signals to permit voice communication at rates as low as 2800 bits/s. The two-way conversion between digital and analog and the compression and decompression together are generally identified as a 'vocoder' functionality. The software also controls TCP/IP packet processing by the PC that is necessary to transmit and receive digital speech signals over the Internet. The PC typically accesses the Internet through a modem-to-modem call to the server or router of an Internet Service Provider (ISP).

U.S. Pat. No. 4,872,197, issued Apr. 21, 1987, to Dorsey et al., titled Verbal Computer Terminal System, describes a system for providing voice telephone access to computers. The system is one wherein remote computers of a conventional type may be addressed or accessed by multiple DTMF telephones and respond or provide output to such telephones in the form of speech derived from the data bases of the respective computers. The system includes means between the standard computer and the DTMF input and analog audio output for emulating computer terminals acceptable to the host computer, for example for converting text data from the computers into speech signals transmissible over telephone line to a caller.

Several providers of Internet telephony software now offer along with the software the use of Internet Phone Servers. These servers, usually in distant cities, are available for users of the software to choose in order to connect to the Internet Phone Network of the particular software provider. In a sense, the servers fulfill the function of a phone directory to access other Internet Phone users. When users of the software connect to the Internet Phone server they are provided with a list of other connected users. From this list a choice may be made and the user can make calls to the other connected parties. In addition to this telephone directory type listing, the connected users are also listed under sublists of topics of conversation. Thus the service is similar to the so called "chat rooms" that are available from ISPs for keyboard to keyboard communication. The obvious shortcoming of the service from a telephony standpoint is an inability to make a call to a telephone subscriber who may or may not own a computer or who may not be on line at the time that the calling party desires to establish a contact.

One system for providing such an Internet telephone service which overcomes this difficulty is described in Farris and Bartholomew U.S. patent application Ser. No. 08/634,543, filed Apr. 18, 1996, for Public Internet Protocol Transport Network. That application is owned by the assignee of the instant application and is incorporated by reference herein in its entirety.

According to the Farris and Bartholomew arrangement, a public switched telephone network utilizing program controlled switching systems controlled by common channel interoffice signaling (CCIS), and preferably an advanced intelligent network (AIN) CCIS network, is arranged in an architecture to provide a methodology for facilitating impromptu telephone customer use of the Internet. Provision is made to permit a caller to set-up and carry out a telephone call over the Internet from telephone station to telephone station without customer access to computer equipment and without the necessity of the customer maintaining a subscription to any Internet service. Billing may be accomplished on a per call basis. The calls may be inter and intra LATA, region or state and may be nationwide. Usage is made of CCIS signaling to set up the call and establish the necessary Internet connections and addressing. Calls may be made from telephone to telephone, from voice capable computer to voice capable computer, or from telephone to computer or computer to telephone.

Another system for providing Internet telephone service on a small business basis is described in Michael J. Strauss application Ser. No. 08/815,358, filed Mar. 11, 1997. That application is also assigned to the assignee of the instant application and is incorporated by reference herein in its entirety. According to that application a small business interexchange Internet telephone service is provided using a pair of personal computers or PCs at distal sites. Each computer is connected to a central office of a Local Exchange Carrier (LEC) by two lines at the respective sites. The computers are provided with speech cards and the software for performing the vocoder and TCP/IP communication functionalities. The computers also have software to allow DTMF digit dialing and collection on both lines.

In response to a call on one of the lines, the called computer answers the call and collects digits corresponding to a PIN number and a desired voice call destination. The computer then initiates a modem data call on the other line to any ISP. The computer executes a log-in procedure with the ISP's modem pool and then initiates an Internet data session with the other distal computer, which computer serves the region covering the destination telephone number. That computer communicates with its ISP on one of its two lines and establishes a local voice telephone call to the dialed destination on the other line. The two lines to each computer are connected or bridged in the respective computers to complete an Internet interexchange link between the calling and called telephones connected to the two distal LECs.

A more versatile system for providing universal and multi-purpose telecommunication network to internetwork service is described in Strauss and Farris application Ser. No. 08/789,809, filed Jan. 28, 1997. That application is assigned to the assignee of the current application and is incorporated by reference herein in its entirety. The Strauss and Farris application describes a multi-purpose or multi-mode network server. The server provides enhanced processing functions in association with a telecommunications network to provide multi-mode communications via a combination of the public switched telephone network (PSTN) and a public packet data network, such as the Internet.

The improved network server includes a multiplicity of application processing units optimized for the processing of specific signal types. The type of signals being handled by the server is ascertained by means of a passive monitor and each type of signal is switched to an application processor on the basis of the signal type identified by the passive monitor. The processor places the processed signal in the protocol of the public packet data network and delivers that signal to a router connected to that network. Provision is made for establishing the availability of a called party through a control network, such as a CCIS network, before establishing an end to end communication link.

In addition to the foregoing a number of other publications have dealt with various types of telephony in switched packet networks.

The book "Mastering the Internet", Glee Cady and Pat McGregor, SYBEX Inc., Alameda, Calif., 1994, ISBN 94-69309, very briefly describes three proprietary programs said to provide real-time video and voice communications via the Internet.

Palmer et al. U.S. Pat. No. 5,375,068, issued Dec. 20, 1994, for Video Teleconferencing for Networked Workstations, discloses a video teleconferencing system for networked workstations. A master process executing on a local processor formats and transmits digital packetized voice and video data, over a digital network using TCP/IP protocol, to remote terminals.

Lewen et al. U.S. Pat. No. 5,341,374, issued Aug. 23, 1994, for Communication Network Integrating Voice Data and Video with Distributed Call Processing, discloses a local area network with distributed call processing for voice, data and video. Real-time voice packets are transmitted over the network, for example to and from a PBX or central office.

Hemmady et al. U.S. Pat. No. 4,958,341, issued Sep. 18, 1990, for Integrated Packetized Voice and Data Switching System, discloses an integrated packetized voice and data switching system for a metropolitan area network (MAN). Voice signals are converted into packets and transmitted on the network. Tung et al. U.S. Pat. No. 5,434,913, issued Jul. 18, 1995, and U.S. Pat. No. 5,490,247, issued Feb. 6, 1996, for Video Subsystem for Computer Based Conferencing System, disclose an audio subsystem for computer-based conferencing. The system involves local audio compression and transmission of information over an ISDN network.

Hemmady et al. U.S. Pat. No. 4,872,160, issued Oct. 3, 1989, for Integrated Packetized Voice and Data Switching System, discloses an integrated packetized voice and data switching system for metropolitan area networks. Sampat et al. U.S. Pat. No. 5,493,568, issued Feb. 20, 1996, for Media Dependent Module Interface for Computer Based Conferencing System, discloses a media dependent module interface for computer based conferencing system. An interface connects the upper-level data link manager with the communications driver.

Koltzbach et al. U.S. Pat. No. 5,410,754, issued Apr. 25, 1995, for Bi-Directional Wire Line to Local Area Network Interface and Method, discloses a bi-directional wire-line to local area network interface. The system incorporates means for packet switching and for using the internet protocol (IP).

These recent developments have lead to wider consideration of ways to make long distance and like calls through the Internet, for example to bypass interexchange (long distance) telephone carriers. As a result, telephone servers have been proposed which would provide interfaces for people using only standard telephones. The servers may receive and initiate telephone calls and perform either a vocoder functionality or a transcoding functionality (between digital telephone network encoding and the appropriate encoding for transport over the Internet). An in-bound server would receive an incoming call and collect destination information from the caller. That server would communicate via the Internet with a distant server. The distant server would perform out-bound functions, such as dialing, to establish a local call to the destination station. The two servers would then set up a voice communication link through the Internet.

While the foregoing types of service are effective to accomplish telephony service over the Internet, the actual call set-up, generally speaking, is time consuming and in some instances cumbersome. For example, according to one procedure a caller may have to dial a number, connect with a computer, dial a PIN (Personal Identification Number), engage in an IVR (Interactive Voice Response) dialog, and dial yet additional numbers to identify the destination desired. According to yet another mode used for connection the caller must serially dial an inordinate number of digits.

The Problem

From the foregoing it will be apparent that there is a need for a system and method of initiating a dialed (DTMF) call or a voice recognition call in a more simplified manner. In particular it would be highly advantageous to be able to initiate such a call using a simple and economical speed dialing mechanism which is daptable to both small and large business applications.

Objects of the Invention

It is a primary object of the invention to provide a simple and economical solution to this need.

It is another object of the invention to provide such a solution through a unique use of the identity of calling and called numbers to provide simple and convenient dialing, including speed dialing.

Summary of the Invention

It is recognized that others have previously proposed use of called and calling numbers to implement various call direction schemes. Thus, Morganstein U.S. Pat. Nos. 5,029,196 and 5,109,405, issued Jul. 2, 1991, and Apr. 28, 1992, respectively, each disclose a user programmable telecommunications system that allows a called party to preprogram alternate destinations for incoming calls. Such programming may be effective in the event of a busy or no-answer status of the called terminal, or simply when the called party has chosen beforehand to limit his/her accessibility.

The described Morganstein call completion system allows a subscriber to control routing of incoming calls based on the identity of the calling party. The system processor is programmable to define a list or table of telephone numbers associated with potential calling parties. Incoming calls are accompanied by calling telephone number identification information. The called subscriber can prioritize incoming calls as a function of caller identity, such that the system routes some calls directly to the called subscriber's extension, others to a voice message service, etc. Still other calls can be routed directly to a secretary's station or a to switch board attendant's position.

For incoming calls the system provides an initial greeting, identifying the called party, and may issue a statement as to a nonaccessible condition of the called telephone terminal. A calling party can be apprised, by a verbal prompt, of an alternate destination at which the called party is available. The user-programmer can designate one or more of a list of incoming telephone numbers as having highest priority. Incoming calls from these numbers will be directly routed by the system to the called user of the system.

FIG. 1 of each of the subject Morganstein Patents depicts the three main units, i.e., the central office 12, a processor 10, and the PBX 14. Conventional calls are directed to the PBX by processor 10. Calls identified as important, or highest priority, are processed by CPU 38 and routed to a proper destination. Other calls are routed to other destinations, such as telephone terminal 24, 25, switchboard attendant 28, or a secretary or voice store 50.

These Morganstein patents thus provide a mechanism for a called party at a PBX to divert an incoming call to destinations established by the called party depending on the identity of the calling party. The various destinations are dependent upon criteria programmed by the called party. The called party fully controls the call direction so that the steps involved in the initiation of the call are unaffected.

According to the present invention there is provided a system and method which permits a calling party to use a unique speed dialing technique to establish a table or personal database which correlates pre-established dialed or voice recognized numbers with destinations sought by the caller via a public data internetwork, such as the Internet. The destination identifications may include domain names, IP addresses, routing information, and telephone numbers. The personal database or table is maintained by an originating entity or service provider which provides to the calling party a voice or data communication link via the Internet to a destination entity or service provider. The destination entity in turn provides a connection to the called party through a destination telecommunication network connection, such as an LEC. The originating entity may be an Internet Service Provider or ISP which provides and maintains the personal database or table for the caller as a subscriber to the ISP enhanced Internet telephony service. The destination entity may likewise be an ISP which may or may not provide a corollary service on a two-way basis.

On the other hand the same service may be provided on a smaller scale by using a pair of personal computers or PCs at the originating and terminating entity sites. In a simplified installation, both computers are connected to a central office of a Local Exchange Carrier (LEC) by two lines. If both computers are to be able to act as originating entities to one another, each computer has a capability of passing to its central office the dialed digits (or voice or other equivalent) in addition to the telephone number of the calling party. Both computers are provided with speech cards and the software for performing vocoder and TCP/IP communication functionalities. Both computers also have software to allow DTMF digit dialing and collection on both lines.

The originating entity, which here is the operator of the originating computer or small business service provider, provides his/her customer with a series of seven or ten digit telephone numbers with which to connect to the provider's computer station. These numbers are the equivalents of numbers to reach DID lines and will be passed by the switch to the computer operator service provider or originating entity. By arrangement between the customer or calling party and the computer operator service provider, the calling party uses these numbers to identify terminals at the destination city which the caller desires to call. Thus a calling table such as the following may have been arranged between the customer and provider and stored in a database associated with the service provider's computer:

1 518-1234—Customer's Mother 2 518-1235—Customer's Branch Office 3 518-1236—Dial tone in destination city.

The calling customer may elect to have a CPE (Customer Premises Equipment) speed dialer or may arrange for speed dial service from his/her local exchange carrier. In either event the caller may speed dial the desired number by the entry of a single digit, as shown by the left column in the above table.

When the caller keys one of the speed dial digits, such as 1, this results in speed dialing a connection to the computer of the originating entity over the first line from the computer to the central office. This also provides the originating entity with the identity of the selected speed dialed digits, in this instance, the digits 518-1234 designating the caller's mother. The originating entity also obtains, via AIN or Caller ID, the telephone number and identity of the calling customer or party. The originating entity maintains in its database a table including the customer's assigned seven (or ten) digit numbers and the corresponding destination telephone numbers, and any routing information necessary to establish an internetwork connection from the originating entity to the destination entity or destination computer service provider. This may include a domain name address, IP address, and the called number, i.e., the telephone number of the customer's mother.

In response to the call from the customer on the first of the two lines, the originating computer answers the call (connects to the calling customer), collects the digits, and enters its database lookup table. Through the use of that table the originating computer obtains all necessary information to establish the requested call. It thereupon connects to its central office via the other of the two lines and through that central office to a local ISP. The local ISP is supplied with the necessary destination addressing, including the telephone number of the calling customer's mother in the distal city. The originating computer uses this information to execute a log-in procedure with the ISP, and then initiates an Internet data session with the computer of the destination service provider. The destination computer is operated by the destination small business which serves the city or region which encompasses the destination telephone number.

The destination computer is connected by one of its lines to any ISP of its choice in the area which it serves. Via that connection and ISP the destination computer receives the addressing information which includes the telephone number of the caller's mother. The destination computer thereupon establishes a local voice telephone call to the dialed destination on the other of its lines. The two lines to each of the computers are then connected or bridged in the respective originating and destinating computers to complete an Internet interexchange link between the calling and called telephones connected to the two distal local exchange carriers. The desired connection is thereupon complete and the customer of the originating service provider may carry on a telephone communication through the Internet.

BEST MODE FOR CARRYING OUT THE INVENTION

Figure 1:
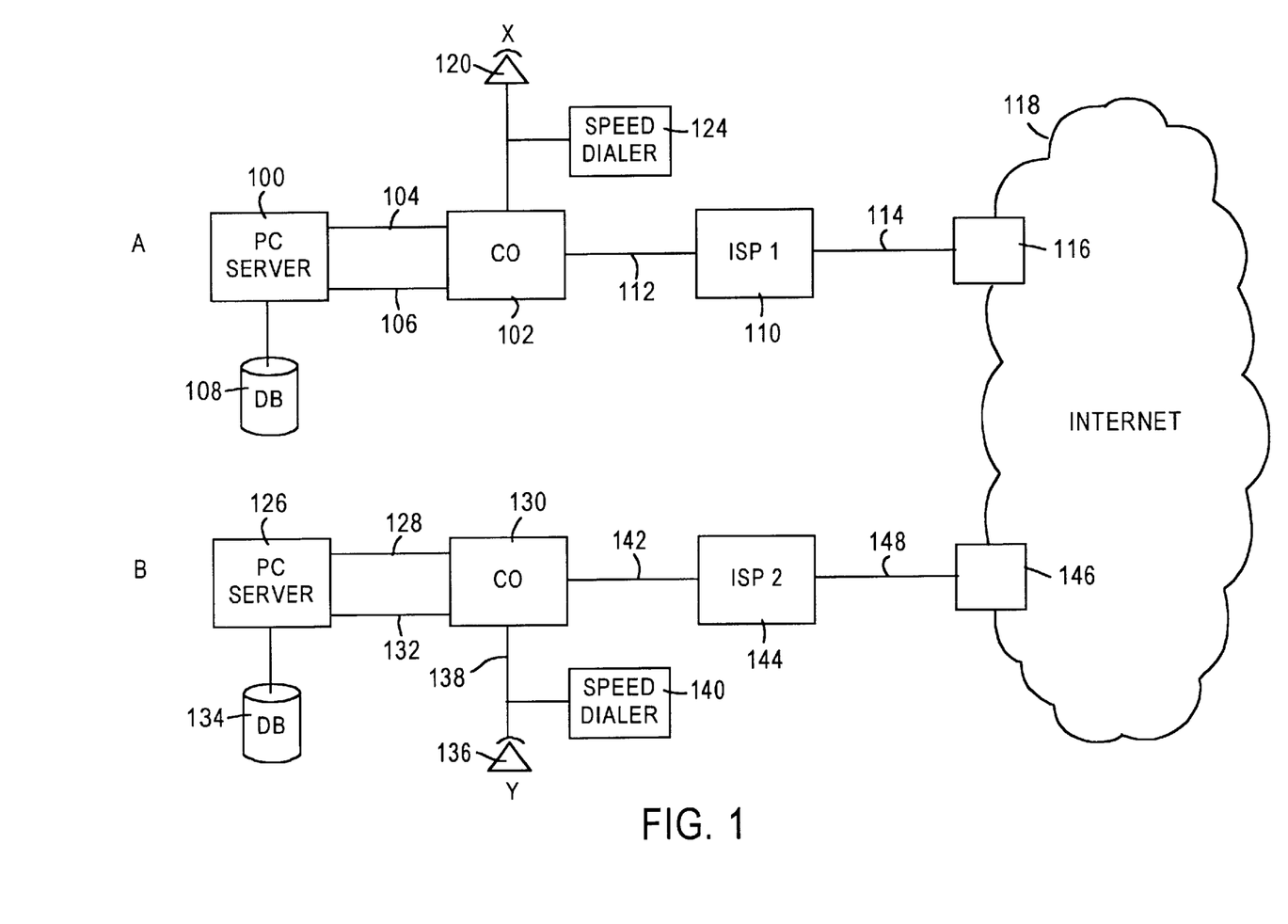
FIG. 1 shows in simplified block diagram form one preferred embodiment of a system for carrying out the invention when providing two way service on a small business scale utilizing personal computer like servers.

Referring to FIG. 1 there is shown one preferred embodiment of the invention for implementing an Internet long distance telephone service on a small business scale utilizing a pair of computers which may be of the personal computer or PC type. According to this embodiment a computer owner desiring to offer low cost Internet long distance telephone service to a distant city or site provides a server in the form of a first personal computer or PC 100. This is shown as PC Server AA. The computer is preferably based on a 486, 586, or faster chip, has an audio or sound board with microphone and speaker or earphone connections, a 28.8 mbps or faster modem, DTMF (dual tone multiple frequency) transmit and receive (decode) capabilities for providing digit transmittal and collection for two lines, and vocoder capability.

The computer is also equipped with a telephone line card having multiple ports and A/D and D/A conversion capabilities. Alternately separate line cards may be used. The sound board or card and the line card or cards may be separate cards or integrated on one board. The computer 100 also has a CPU and a digital audio storage for storing audio prompts or messages to be delivered and also for storing messages which may be received, as in the fashion of a conventional telephone answering machine. The line card also is provided with digital signal processing (DSP) capabilities, which include signal compression and expansion or decompression. The CPU, line card, sound card and digital audio storage are all connected to the computer bus in conventional fashion.

According to the invention the PC Server A is connected to a local exchange carrier (LEC) end office or central office 102. In this example of the invention the connection is made via a first line 104 of the DID variety, which permits service to a multiplicity of numbers by which the caller may connect to the server. In the particular example this is shown as a DID line, which passes on to the server the number of the calling party. Other type lines may be used as is presently described.

The Server A is also provided with a database which is shown at 108 for storing a number translation table. This database may be integral with the computer storage so long as sufficient capacity and convenient addressing is provided. The table in database 108 stores a translation table for translating the numbers dialed by the calling customer to telephone numbers in the destination city which the caller seeks to reach. Such a table is shown at 218 in FIG. 4. The table 218 is the personal table of customer John Doe who resides in Maryland and whose telephone number is 301-223-4567. This is shown at 212 in FIG. 4. The numbers shown in the Dialed Number Column 214 are the numbers which the customer John Doe may dial to reach the server, and simultaneously identify the number of the called party which the caller desires to reach in the distal city. The corresponding numbers in the Destination Number column 216 are the numbers which the caller desires to reach by dialing the digits in the left column.

Each customer of the service provider which maintains and operates Server A is provided with a similar table which the customer populates with numbers. By way of example, the first number in the Destination Number column in FIG. 4, 504-678-1482, may be the number of John Doe's mother who resides in New Orleans. The second number, 504-712-6842, may be the number of John Doe's branch business office in New Orleans. The third number 504-400-1000 is a fictitious number which the destination server will translate into a request for a dial tone in the local exchange carrier network in New Orleans.

Referring to FIG. 1, the central office 102 is connected to ISP1, shown at 110, by a line, or a line and intermediate trunks, tandems and lines 112. The ISP is connected by a suitable T1/T3 or ISDN link 114 to an access router 116 in the Internet 118. The telephone terminal X shown at 120 represents a typical customer connected to the central office 102 by a local link 122. The customer X preferably has a speed dialer 124. The speed dialer may be programmed to speed dial the numbers in the left column 214 in FIG. 4 to request Internet connection to the corresponding numbers in the right hand column 216.

In this example, where it is assumed that New Orleans is the destination city to which the service is provided, there will be in that city or area a service provider having a substantially similar installation. Thus, referring to FIG. 1, there is shown at 126 a PC Server B. If the service provider associated with PC Server B desires to provide two way service to the city or area of PC Server A, the PC Server B may be connected by a DID link 128 to the end office central office 130. The Server B is also connected to that central office by a second line or link 132, which may be a POTS link. The PC Server B is provided with a database 134 similar to that described with respect to PC Server A. A typical customer of PC Server B is shown at 136 connected to the central office 130 by a local link 138. The customer Y at 136 may also be provided with a speed dialer 140.

The central office 130 of the New Orleans local exchange carrier or LEC provides connection 142 to an ISP2 144 in the New Orleans area. The ISP2 is in turn connected to an access router 146 providing connection to the Internet 118 via a suitable link 148.

Following is a description of an intercity, interexchange telephone call via the Internet implemented by the system shown in FIG. 1.

A caller at the originating or calling telephone terminal X, desiring an Internet voice connection to the distant called or destination telephone terminal Y, dials in to the originating central office 102 with a directory number which is a number subscribed to by the service provider operating PC Server A for providing the Internet long distance telephone service. The particular number which is chosen by the caller depends upon the particular destination that he/she desires to reach. Thus if the caller is the hypothetical John Doe used as an example above, the call may either be placed to his mother, his New Orleans branch office, or alternatively, John Doe may desire to receive a dial tone from a central office in New Orleans. Depending upon his choice, John Doe either speed dials the selected number with a one or two digit entry, or in the alternative, dials the local number by entry of the appropriate seven digits from the table 210 in FIG. 4.

The originating central office 102 connects to the PC Server A using the DID line 104 and delivers to the PC Server A the digits of the number of the calling terminal X. In this example those digits constitute the telephone number of John Doe. The PC Server A collects both the dialed digits and the signaled digits of the caller's number. The Server thereupon enters its database 108 with these two numbers and locates the table 210 in FIG. 4. From the table in FIG. 4 the PC Server A selects the destination number corresponding to the digits which were dialed by the caller X.

Assuming that the caller is John Doe calling his mother, the PC Server A selects the number 504-678-1482 from the table. The originating PC Server A thereupon goes off-hook on the second line or POTS line 106 to the central office 102. The PC Server A auto-dials the directory number of its local ISP 110, and connects to that ISP on the POTS line 106. While this line 106 has been referred to as a POTS line as the type of line that a small business may find adequate, it will be appreciated that it may also constitute an ISDN or T1/T3 line.

The originating PC Server A next formulates a datagram. That datagram may contain the domain name or IP (Internet) address of the destination PC Server B. The datagram also contains the digits of the directory number to which it is desired to connect. This datagram is delivered to the originating ISP 110 which routs the datagram through the Internet to the destination ISP 144.

The destination ISP 144 translates the TCP/IP datagram to a suitable protocol for the telephone line 148 to the central office 130 in the distant LEC. This datagram may be delivered over the POTS line 132 to the modem in the destination PC Server B. The destination PC Server B responds to the information in the datagram and dials the number 678-1482, a local call, on the line 128. The usage of lines 128 and 132 could be reversed in this instance wherein the capabilities of the DID line is not required. This dialing attempts to establish a connection with the called telephone terminal Y, which in this example is the telephone of John Doe's mother.

The destination central office 130 in New Orleans checks the line or local loop 138 to the called telephone terminal Y. If the line 138 is busy, the central office 130 so signals the calling PC Server A by returning a busy signal. The destination PC Server B sends a stored datagram busy signal over the line 128 to the central office 130 and ISP 144. The ISP 144 routes the datagram over the Internet 118 to the originating ISP 110. The originating ISP makes the necessary translations and delivers a busy datagram to the originating PC Server A. The originating PC Server A reacts to this datagram by sending a pre-stored voice message to the caller over the line 104, advising of the busy condition on the called line. As an alternative to this announcement, the voice prompt to the calling party may offer to retry the number if the calling party so signals by depressing a designated key.

If the destination central office 130 determines that the called line 138 is available, the central office 130 connects to the called telephone terminal Y. The central office 130 then sends a ring signal to the telephone terminal Y over the local loop 138, and a ring-back signal to the calling PC Server A over the line 106. If the called party fails to answer after a pre-determined number of rings, the distant PC Server B goes on-hook on the line 128 and sends a pre-stored "no answer" datagram to its ISP 144 over the other line 132. This is delivered via the Internet to the originating PC Server A. The PC Server A in turn delivers a pre-stored "no answer" voice message to the caller.

On the other hand, if the called telephone terminal Y goes off-hook, a connection to the called station is completed on the first line 128. The destination PC Server thereupon sends to the originating PC Server a "connect" signal or datagram and connects the first and second lines 128 and 132. The originating PC Server A thereupon may optionally send a pre-stored "You are connected" voice message to the caller at telephone terminal X over the first line 104, and connects the first and second lines 104 and 106. The complete connection is thereby established and the call commences.

At this point a timer may be started at the originating PC Server A for billing purposes. A determination is continually made as to whether or not either party has gone on-hook. If such a condition is detected by the originating PC Server A, it immediately stops the timer and stores a billing entry in the storage of the originating PC Server A. If the determination is made by the destination PC Server B, that server dispatches a notifying datagram to the originating PC Server A. The PC Server A thereupon terminates the timing and enters the billing information in its storage.

It will be appreciated that while the illustrative example in FIG. 1 has shown the originating or calling telephone terminal connected to the same central office as the originating PC Server A, and the destination or called telephone terminal connected to the same central office as the destination PC Server B, this has been for the purpose of convenience. In practice one originating or destinating PC Server may serve as a local connection for telephone terminals connected to any one or more central offices in the local exchange carrier (LEC) network which is involved. In the most common instance such LEC networks will be equipped with common channel interoffice signaling (CCIS) networks, and these networks and the signaling through these networks will be relied upon to establish the status of the called line. CCIS networks are not shown in FIG. 1, inasmuch as their nature and operation is well known to those skilled in the art.

Figure 2:
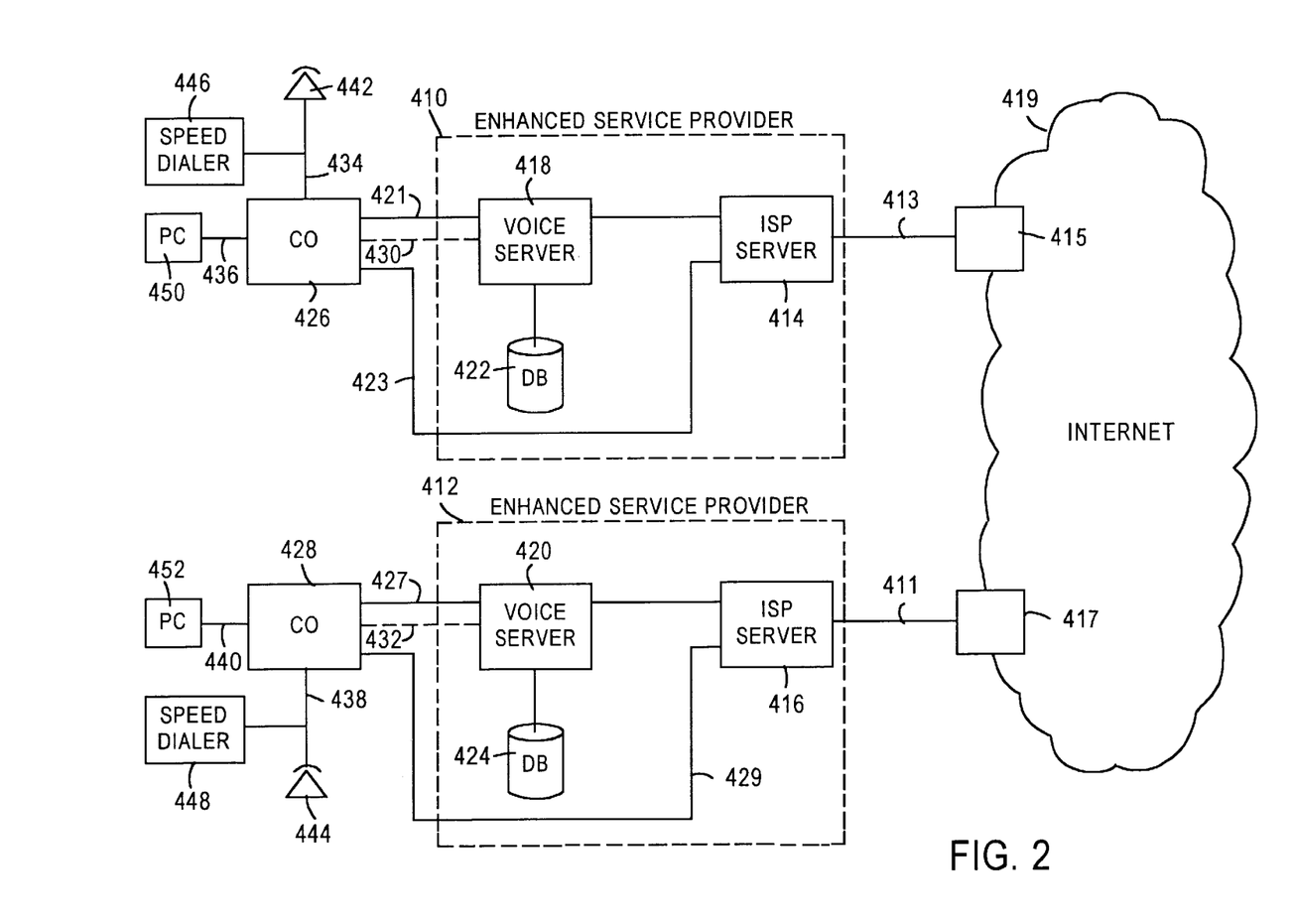
FIG. 2 shows a simplified block diagram of another embodiment of the invention designed to provide the same type service on a larger scale.

Referring to FIG. 2 there is shown another preferred embodiment of the invention adapted to handle high traffic volume such as the volume now handled by ISPs. The system is designed to provide high capacity transport of two way enhanced voice or telephone communications on a wide area basis. The architecture is adapted for incorporation into existing national ISP systems and is capable of providing virtually nationwide Internet telephone service with the enhanced features described above in connection with the small business embodiment shown in FIG. 1.

Figure 5:
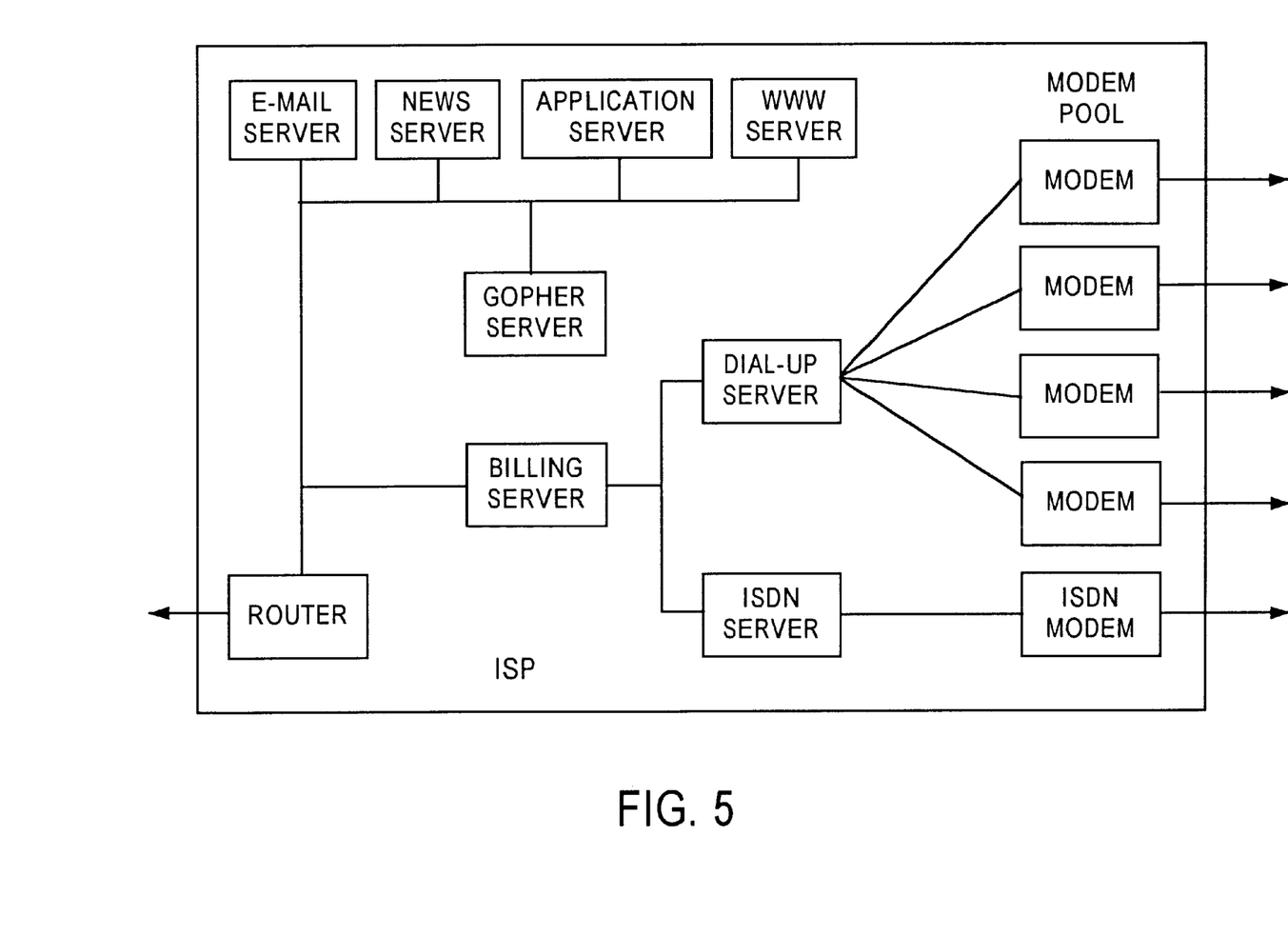
FIG. 5 is a simplified block diagram of a typical Internet Service Provider (ISP) installation.

Referring to FIG. 2 there are shown as illustrative examples two widely spaced Enhanced Internet Service Providers (ESPs) 410 and 412. Each ESP includes an ISP server 414 and 416. These servers incorporate all of the capabilities of current ISPs of the type discussed in connection with FIG. 1. A typical ISP installation is shown in FIG. 5. The ISPs 414 and 416 are connected to Internet gateway routers 415 and 417 via T1/T3 links 413 and 411, which provide access to the Internet 419. The bulk of the traffic carried by ISPs 414 and 415 at the present time is the conventional Internet traffic. The transport for this traffic is provided by links 423 and 429 connecting the ISP servers to their respective end offices 426 and 428.

The ESPs 410 and 412 include voice servers 418 and 420 which provide on a high capacity basis the functionality of the PC Servers discussed with respect to the system in FIG. 1. The voice servers are each provided with table databases 422 and 424 of the type used with the servers 100 and 126 in the system of FIG. 1. However, the capacity of the databases 422 and 424 are commensurate with the increased number of customers which would be associated with service on a national basis.

The voice servers 418 and 420 are connected to end office central offices 426 and 428 via links 421 and 427, which may be T1/T3 links. These central offices have service switching point capability and are connected to the voice servers by SMDI (Simplified Message Desk Interface) links 430 and 432. These links carry SMDI signaling, which serves the purpose of passing to the voice servers the telephone number of the calling terminal. The voice servers obtain the number which was dialed by the caller in collection of digits as the call is dialed.

The central offices 426 and 428 serve as end offices for a plurality of local links which are illustratively shown as the links 434, 436, 438, and 440. The links 434 are connected to telephone terminals 442 and 444. The telephone terminals 442 and 444 are preferably provided with speed dialers 446 and 448. It will be understood that the speed dialing capability may alternately provided from the central offices 426 and 428 of the Local Exchange Carrier (LEC). The local links 436 and 440 are connected to personal computer terminals 450 and 452. It will be understood that the central offices 426 and 428 also are connected to tandem switches and other central offices to terminals throughout the LEC network.

Figure 4:
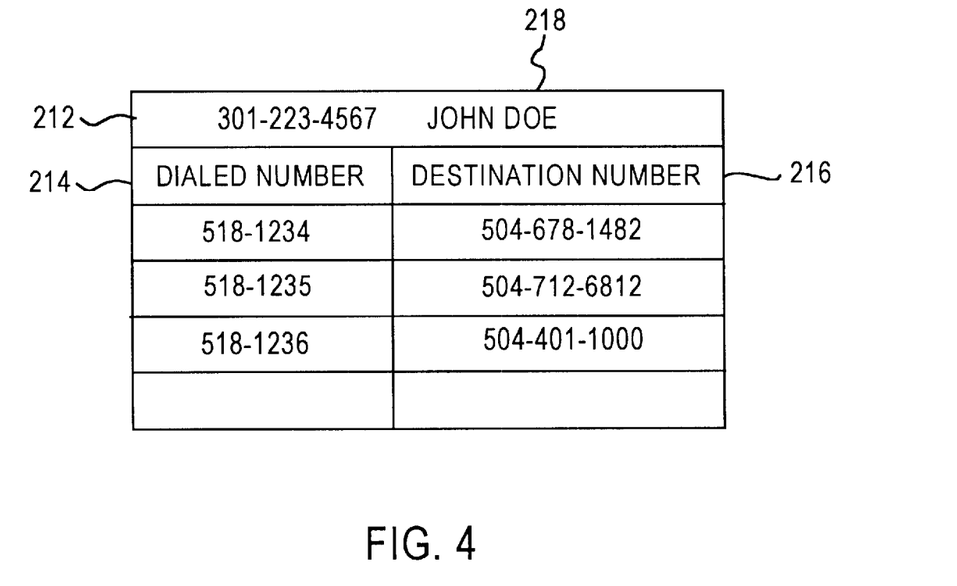
FIG. 4 is a diagram of an illustrative number translation table maintained in a database of an originating service provider.

Typical operation of this embodiment of the invention may be as follows:

A caller at the originating or calling telephone terminal or station 442, desiring an Internet voice connection to the destination telephone station 444, dials in to the originating central office 426 with a directory number. That directory number is a number which he/she has chosen from a list of directory numbers which were provided by the Enhanced Service Provider which supplies the service. In this illustration the ESP 410 offers the service and has provided the customer with the telephone numbers found in the left column of the table of FIG. 4. It will be understood that while only three numbers are shown in FIG. 4, this is illustrative only and that many more numbers may be provided.

The particular number which is chosen by the caller will depend upon the particular destination that he/she desires to reach. Thus if the caller is the hypothetical John Doe, used as an example above, the call may be placed to his mother, his New Orleans branch business office, or alternatively, John Doe may desire to receive a dial tone from a central office in New Orleans. Depending upon his choice, John Doe either speed dials the selected number with a one or two digit entry, or in the alternative, dials the local number by entry of the appropriate seven digits from the table 210 in FIG. 4.

The originating central office 426 connects to the Voice Server 418 using the line 421, and uses the SMDI link 420 to deliver to the Voice Server 418 the digits of the number of the calling terminal 442. In this example those digits constitute the telephone number of John Doe. The Voice Server 418 collects both the dialed digits and the SMDI signaled digits of the caller's number. The server thereupon enters its database 422 with these two umbers and locates the table 210 in FIG. 4. From the table in FIG. 4 the Voice Server 418 selects the destination number corresponding to the digits which were dialed by the caller at terminal 442. Assuming that the caller is John Doe calling his mother, the Voice Server 418 selects the number 504-678-1482 from the table. The originating Voice Server 318 thereupon goes off-hook on the line 421 to the central office 426. The Voice Server 418 formulates a datagram. That datagram may contain the domain name or IP (Internet) address of the destination Voice Server 425. The datagram also contains the digits of the directory number to which it is desired to connect. This datagram is delivered to the originating ISP Server 414 which routs the datagram through the Internet to the destination ISP Server 416.

The destination ISP Server 416 delivers the datagram to the destination Voice Server 425. That Voice Server responds to the information in the datagram and dials the number 678-1482, a local call, on the line 427. This dialing attempts to establish a connection with the called telephone terminal 444, which in this example is the telephone of John Doe's mother.

The destination central office 428 in New Orleans checks the line or local loop 438 to the called telephone terminal 444. If the line 438 is busy, the central office 428 so signals the calling Voice Server 425 by returning a busy signal. The destination Voice Server 425 sends a stored datagram busy signal to the ISP Server 416. The ISP Server 416 routes the datagram over the Internet 419 to the originating ISP Server 414. The originating ISP Server makes any necessary translations and delivers a busy datagram to the originating Voice Server 418. The originating Voice Server 418 reacts to this datagram by sending a pre-stored voice message to the caller over the line 421, advising of the busy condition on the called line. As an alternative to this announcement, the voice prompt to the calling party may offer to retry the number if the calling party so signals by depressing a designated key. As a still further alternative the Voice Server may send a busy indication signal to the central office 426 which in turn sends its busy signal to the caller at terminal 442.

If the destination central office 428 determines that the called line 438 is available, the central office 428 connects to the called telephone terminal 444. The central office 428 then sends a ring signal to the telephone terminal 444 over the local loop 438, and a ring-back signal to the calling Voice Server 438 over the line 427. If the called party fails to answer after a pre-determined number of rings, the distant Voice Server 425 goes on-hook on the line 427 and sends a pre-stored "no answer" datagram to its ISP Server 416. This is delivered via the Internet to the originating Voice Server 418. The Voice Server 418 in turn delivers a pre-stored "no answer" voice message to the caller and may deliver a further voice message offering to retry the call in a specified time.

On the other hand, if the called telephone terminal 444 goes off-hook, a connection to the called terminal is completed on the line 427. The destination Voice Server 425 thereupon sends to the originating Voice Server 418 a "connect" signal or datagram and connection to the calling party is made through the central office 426. The originating Voice Server 418 thereupon may optionally send a prestored "You are connected" voice message to the caller at telephone terminal 442. The complete connection is thereby established and the call commences.

At this point a timer may be started at the originating Voice Server 426 for billing purposes. A determination is continually made as to whether or not either party has gone on-hook. If such a condition is detected by the originating Voice Server 426 it immediately stops the timer and stores a billing entry in the storage of the originating Voice Server. If the determination is made by the destination Voice Server 425, that server dispatches a notifying datagram to the originating Voice Server 418. The Voice Server 426 thereupon terminates the timing and enters the billing information in its storage.

In the examples and embodiments of the invention which have been described the information containing the telephone number of the calling customer has been transferred in band via a DID or DID like line or out of band by SMDI signaling. The invention also encompasses equivalent modes of transporting this information such as the use of Feature Group or ISDN lines or the like.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. In a hybrid communication system including telecommunication networks and a packet data network, said telecommunications networks linked to user terminals, the combination comprising:

a first of said user terminals having associated therewith a plurality of destination terminal numbers;

a first gateway including a storage related to said first user terminal and containing said plurality of destination terminal numbers and a plurality of dialing numbers which may be dialed to connect said first user terminal to said gateway via a first of said telecommunication networks, each of said plurality of destination numbers corresponding to one of said plurality of dialing numbers;

said first gateway including server means to translate a voice or data signal received by said first gateway from said first user terminal into a signal for communicating with a first gateway processor of said packet data network;

a second gateway including server means to translate a signal received from a second gateway processor of said packet data network to a voice or data signal for communicating with a second user terminal connected to a second of said telecommunication networks; whereby dialing of one of said numbers in said first series of numbers from said first user terminal to connect to said first gateway results in communicating through said packet data network to said second gateway the number corresponding to the dialed number which is thereby dialed to connect said second gateway to a destination terminal having such dialed destination terminal number and establish a link between said first and destination terminals through said packet data network; and further including a connection between said first of said user terminals and said first gateway which bypasses said server means.

2. A method of routing of voice and data communication between terminals having respective telephone numbers via a communication system that includes telecommunication networks and a data packet network, said method comprising the steps of:

in response to input of digits of a first telephone number at a terminal originating a telephone call, connecting the originating terminal through a first telephone switching network to a first service provider;

communicating to said first service provider the telephone number of the originating terminal;

accessing a storage medium of said first service provider to obtain a table, associated with the originating telephone number, having a record in which the first telephone number is correlated with a single destination telephone number, said destination telephone number being associated with an address of a second service provider, to obtain from said table said destination telephone number address;

communicating from said first service provider to said second service provider, via said packet data network, said destination telephone number;

originating, at said second service provider, a call to the destination telephone number via a second telephone switching network; and establishing a voice and data communication link between said originating and destination terminals via said packet data network and said first and second telephone switching networks;

wherein said record is one of a plurality of records that correlate dialing numbers with respective destination telephone numbers in said table; and wherein said storage medium comprises a plurality of tables associated with respective originating terminals, each of the plurality of tables containing in common a set of said dialing numbers, each of the dialing numbers in said set in each table being correlated on an individual basis with respective destination telephone numbers.

3. A system for routing voice and data communication between terminals having respective telephone numbers via hybrid paths containing both analog voice and data packet format, said system comprising:

a first telephone switching network linked to a first plurality of user terminals and a first Internet gateway;

a second telephone switching network linked to a second plurality of user terminals and a second Internet gateway; and a first service provider connected to said first telephone network, said first service provider comprising a storage medium containing a plurality of tables associated with respective ones of said first plurality of user terminals, the plurality of tables containing in common a set of dialing numbers for connection to the first service provider, each of the dialing numbers in said set in each table being correlated independently with a respective destination telephone number of said second plurality of user terminals; wherein in response to input of one of said dialing numbers at one of said first plurality of user terminals, one of said tables is accessed to obtain a destination telephone number that corresponds to the dialing number input, and said destination telephone number is transmitted to said second Internet gateway for establishing a voice and data communication link between originating and destination terminals via said packet data network and said first and second telephone switching networks.

* * * * *